Patented June 22, 1937

2,084,927

UNITED STATES PATENT OFFICE 2,084,927

SYNTHETIC RESINS AND OILS

Charles C. Towne, Poughkeepsie, N. Y., assignor to The Texas Company, New York, N. Y., a corporation of Delaware No Drawing. Application August 3, 1934
Serial No. 738,293

4 Claims. (Cl. 260—2)

The present invention relates to the preparation of resinous and oily condensation products from benzene and halides of normally gaseous olefines.

The production of synthetic lubricating oils and resinous condensation products from hydrocarbons of the naphthalene series and olefines has heretofore been proposed. Also, it has been suggested to produce viscous oils or resins by reacting xylol with ethylene chloride.

As distinguished from the above, the present invention contemplates the manufacture of synthetic resins or oils from benzene and a halide of a normally gaseous olefine, such as ethylene or propylene chloride. I am aware that the literature discloses the preparation of lower boiling condensation products, such as dibenzyl, by the Friedel-Craft reaction, by condensing benzene with hydrocarbon halides in the presence of aluminum chloride. I have discovered that by control of the proportions of the reactants and the conditions of the reaction, substantial yields of synthetic resins or viscous oils can be produced.

In accordance with the present invention, benzene is mixed with a halide of a normally gaseous olefine, such as ethylene or propylene chloride, at normal or atmospheric temperatures and pressures; and a quantity of a condensation catalyst, either of the Friedel-Craft type such as aluminum chloride, or metallic aluminum, is added. The mixture is stirred and may be gently heated to start reaction, although this usually is unnecessary. During the reaction, considerable heat may be generated, and the temperature is preferably controlled by a cooling bath to prevent a rise above about 60° C. In order to produce a resin, proportions of the order of 1-2 parts of benzene, 8 parts of the olefine halide, and 1 part of aluminum chloride, by weight, give very satisfactory results. On the other hand, where a viscous oil of the character of a lubricating or transformer oil is desired, proportions of the order of 10-12 parts of benzene to 8 parts of the olefine halide with 1 part of aluminum chloride, by weight, are satisfactory. Intermediate amounts of benzene between the proportions specified above give viscous oily condensation products which have the characteristics of synthetic drying oils.

In the case of the production of a resin from ethylene chloride and benzene, a Friedel-Craft catalyst of the character of aluminum chloride is preferred. On the other hand, propylene chloride reacts effectively with benzene in the presence of either metallic aluminum or a Friedel-Craft catalyst. Care should also be exercised in the production of a resin from ethylene chloride and benzene with the proportions of ingredients specified above, because if the reaction is allowed to continue much in excess of about 15 to 20 minutes, a sudden gel formation may occur, which does not decompose even when boiled with the addition of water. However, when the reaction is terminated prior to the gel stage, such as by the addition of water or an alkaline solution which effects the decomposition of the aluminum addition compounds, a very satisfactory resin is obtained. While a comparatively short reaction time is sufficient for the production of resins with the proportions stated, a longer reaction time of the order of 1 to 3 hours or more is preferably provided in the case of the production of viscous oils, where higher proportions of benzene are employed. In either case, water or an alkaline solution may be added to the total reaction material to cause decomposition and solution of the catalyst, which may then be removed as a lower aqueous layer, preferably after the addition of a solvent for the condensation product, such as benzol. Resin is recovered from the dried upper oily layer by distilling off the solvent and lower boiling polymers. In the case of production of oily condensation products, the same procedure may be employed or the reaction material may first be allowed to stand, whereupon it stratifies into an upper oily layer containing substantially all of the benzene and lower boiling oily polymers, and a lower sludge layer which is made up of viscous oil in chemical combination with the catalyst. These may be separated by decantation, whereupon viscous oils of varying properties may be obtained.

The following are listed as specific examples of the present invention:

Example 1

To a mixture of 400 g. of ethylene chloride, $C_2H_4Cl_2$, and 50 g. of benzene, 50 g. of aluminum chloride were added. With agitation, the temperature rose from 22° C. to 48° C. After a reaction time of 12 minutes, 500 cc. of hot water were added to decompose the reaction product and dissolve the catalyst, which was separated as a lower aqueous layer following the addition of benzol to insure solution of resinous condensation product. The benzol layer was distilled, and 53 g. of a red resin having a green bloom were obtained. The resin was hardened by stirring with acetone at room temperature, which served to dissolve retained oils and softer resinous materials. The undissolved resin was filtered from the acetone solution and dried on a steam bath, producing a brittle resin whose color had deepened from red to a brownish red with a green cast. By heating at 175°–200° C., the resin became very hard.

*Example 2*

200 g. of propylene chloride, $C_3H_6Cl_2$, were mixed with 25 g. of benzene and 25 g. of aluminum chloride, the reaction temperature rising from 25° C. to 52° C. After a reaction time of 1 hour, the product was decomposed by the addition of water, and the catalyst removed as a lower aqueous layer, following the addition of benzol. After vaporization of solvent and lower boiling liquids from the benzol layer, 44 g. of a solid hard brittle orange-red resin were obtained.

*Example 3*

1000 g. of ethylene chloride, 1580 g. of benzene and 125 g. of aluminum chloride were mixed and warmed to 36° C., when reaction set in and continued without further application of heat until a reaction temperature of 45° C. was reached. The reaction products were then further heated to 60° C. when further reaction set in. The material was then allowed to stand for about 12 hours, when it stratified into a top oil layer and a bottom sludge layer. The top oil layer was washed with water and alkali and distilled to remove a cut boiling between 250°–300° C. containing dibenzyl and amounting to 221 g., leaving an oily residue of golden color amounting to 344 g. The bottom sludge layer contained a green oil amounting to 310 g. Tests on the golden oil and the green oil yielded the following properties:

|  | Golden oil | Green oil |
|---|---|---|
| Specific gravity | 1.031 | 1.041 |
| Flash, ° F | 340 | 240 |
| Fire, ° F | 390 | 335 |
| Viscosity at 100° F | 174 | 403 |
| Viscosity at 210° F | 44 | 60 |
| Viscosity index | 80 | 100+ |
| Pour, ° F | −25 | −20 |
| Carbon residue percent | 2.99 | 7.9 |
| Iodine number | 1.0 | 7.0 |
| Sligh number | 4.7 | 799 |
| Percent Cl | None | .025 |

*Example 4*

1130 g. of propylene chloride were mixed with 1560 g. of benzene and 125 g. of aluminum chloride. The aluminum chloride was added slowly in small portions during ½ hour. The reaction started slowly but then proceeded rapidly, no external heat being necessary. The temperature rose to 60° C. and then receded. Upon settling over night, two layers formed which were separated and worked up in the manner described above to recover the oils. The top layer yielded 772 g. of a blue bloom yellow oil and the sludge layer yielded 400 g. of a red oil with a green bloom. Tests on these oils yielded the following results:

|  | Top oil | Sludge oil |
|---|---|---|
| Specific gravity | 1.006 |  |
| Flash, ° F | 330 |  |
| Fire, ° F | 365 |  |
| Viscosity at 100° F | 480 |  |
| Viscosity at 130° F |  | 1770 |
| Viscosity at 210° F | 52 | 124 |
| Viscosity index | 9 | Less than 0 |
| Pour, ° F | 0 |  |
| Carbon residue | 2.7 | 7 |
| Iodine number | 6.0 | 70 |
| Sligh number | 1.2 | 133 |
| Percent Cl | None |  |

It is to be noted that the lower viscosity synthetic oils have good oxidation stability, a property which renders them of particular value for use as transformer oils. Whereas the oils from ethylene chloride have high viscosity index, those from propylene chloride have low viscosity index. The former were found to be in general more stable than the latter, although both light oils are resistant to oxidation. The oils from the top layer have good resistance to sludging. Both types of oils have high solvent power and are readily miscible with certain solvents, such as aniline and nitromethane, at room temperature, which distinguishes them from petroleum lubricating oils which are in general immiscible with such solvents at ordinary temperatures.

Where intermediate proportions of benzene are employed, such for example as about 2–10 parts by weight of benzene to 8 parts by weight of ethylene or propylene chloride, in the presence of about 1–2 parts by weight of a condensation catalyst of the character specified above, viscous sticky oils are produced which have the general properties of drying oils. Thus, these oils oxidize upon exposure, and when painted on panels dry to a tough hard film.

Other halide addition products of the olefines may be used, such as the bromides. In place of metallic aluminum or aluminum chloride, other condensation catalysts of the Friedel-Craft type can be employed, such as the halides of iron, boron, nickel, tin, zinc, antimony, cadmium and manganese.

Obviously many modifications and variations of the invention, as hereinbefore set forth, may be made without departing from the spirit and scope thereof, and therefore only such limitations should be imposed as are indicated in the appended claims.

I claim:

1. A synthetic resin comprising a non-gelled condensation product of about 8 parts by weight of an olefine chloride selected from the group consisting of ethylene chloride and propylene chloride, with about 1–2 parts by weight of benzene, in the presence of about 1–2 parts by weight of a condensation catalyst selected from the group consisting of metallic aluminum and metallic halides of the Friedel-Craft type.

2. The process of preparing a synthetic resin which comprises condensing about 1–2 parts by weight of benzene with about 8 parts by weight of an olefine chloride selected from the group consisting of ethylene chloride and propylene chloride, in the presence of a condensation catalyst selected from the group consisting of metallic aluminum and metallic halides of the Friedel-Craft type, adding an aqueous liquid to decompose and dissolve the catalyst prior to gelation, separating the solution of catalyst from the resinous reaction product, and removing liquid solvents by distillation from the resinous reaction product to obtain a solid resin.

3. The method of preparing a synthetic resin, which comprises condensing about 1-2 parts by weight of benzene with about 8 parts by weight of ethylene chloride in the presence of about 1-2 parts by weight of aluminum chloride, the condensation reaction tending to form a gel if allowed to continue, terminating the reaction prior to gelation by the addition of an aqueous liquid to decompose and dissolve the catalyst, separating the solution of catalyst from the resinous reaction product, and removing liquid solvents by distillation from the resinous reaction product to obtain a solid resin.

4. A solid, hard, brittle, synthetic resin comprising a non-gelled condensation product of about 8 parts by weight of propylene chloride with about 1-2 parts by weight of benzene, in the presence of a condensation catalyst selected from the group consisting of metallic aluminum and metallic halides of the Friedel-Craft type.

CHARLES C. TOWNE.